United States Patent Office 3,183,351
Patented May 11, 1965

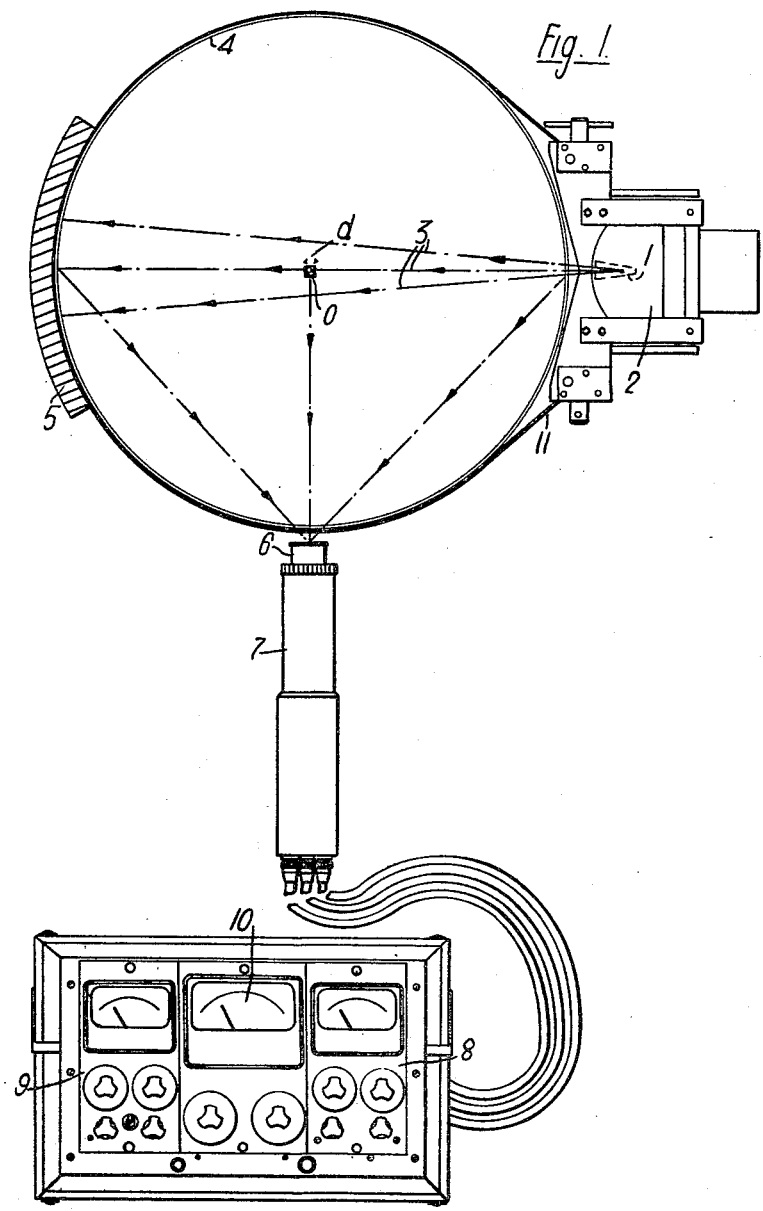

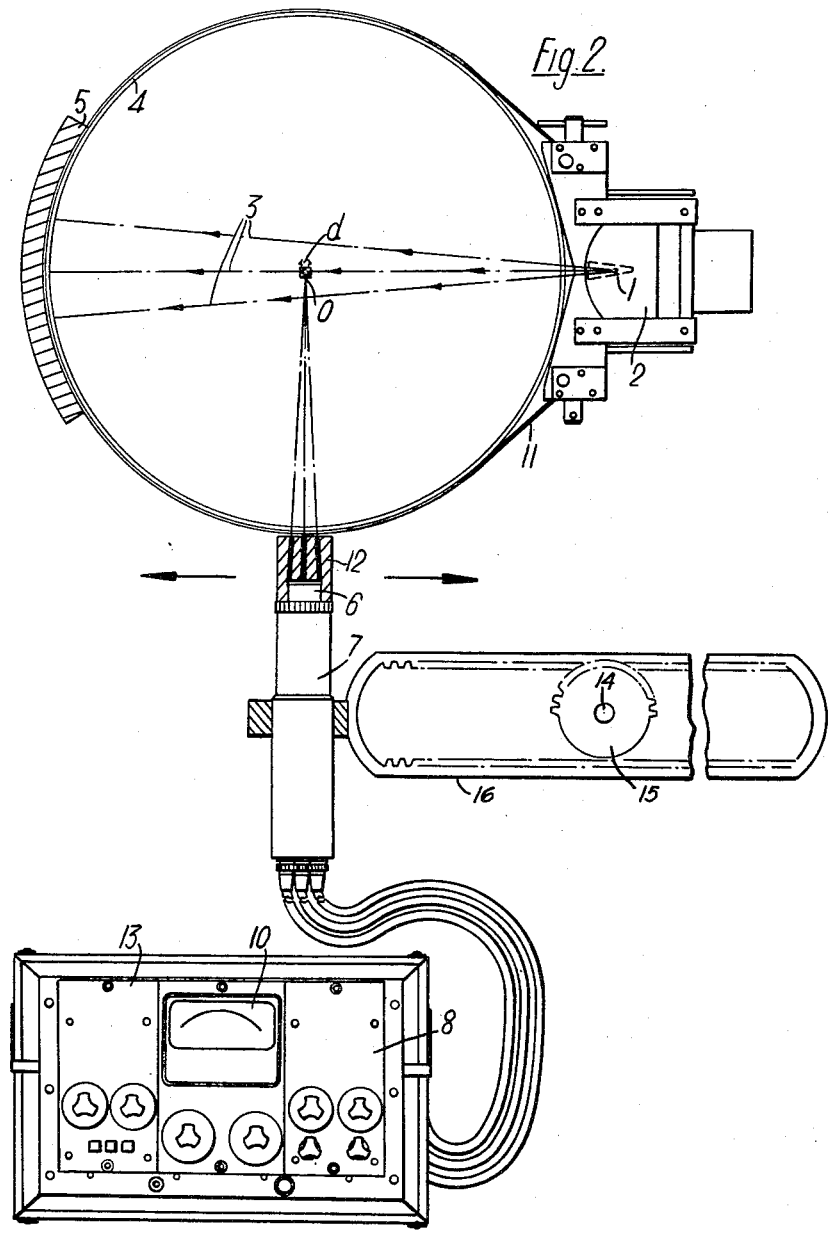

3,183,351
MEASUREMENT OF FLUID DENSITY BY DETECTING RADIATION SCATTERED FROM SELECTED PORTIONS ALONG THE PRIMARY BEAM PATH
Douglas F. White, Rayleigh, Essex, England, assignor to E. K. Cole Limited, Ekco Works, Priory Crescent, Southend-on-Sea, England
Filed Dec. 18, 1961, Ser. No. 160,037
Claims priority, application Great Britain, Dec. 22, 1960, 44,015/60
3 Claims. (Cl. 250—43.5)

This invention relates to a method and means for determining the quality of fluids produced in a manufacturing plant. In such plant it is very often found that the quality of the fluid, other things being equal, is a function of the fluid density. For instance in the production of steam, the quality of the steam itself is a function of its water vapour content and the percentage of water vapour content can be determined by measuring the density of the fluid being produced. Various means and methods have been devised for measuring the density of fluids flowing within a pipe or the like, using a penetrative beam of radiation (e.g. gamma rays) with means for observing the absorption of energy from the beam and using this for density measurement. When the density of the fluid within the pipe is such that the absorption within the pipe is minute compared with the absorption of the pipe wall, it is very difficult or expensive to provide a reliable apparatus since the quantities involved are so small that the variations of an even greater order of smallness, representing changes in density, are practically undetectable. This would be the case for instance where a metallic pipe was conducting a gaseous fluid, for example steam. We use the term "gaseous fluid" herein to mean a gas or vapour together with any matter suspended therein. Of course in some cases it is possible to use beta rays but such an arrangement would require the radiation source and detector to be situated within the pipe. This may be impracticable for many reasons, e.g. high temperature. Furthermore with the use of beta radiation it is necessary to provide very thin windows for the passage of the radiation and this would be impracticable where the contents of the pipe were at a high pressure or contained abrasive material.

The present invention provides a method of analysing the density of a gaseous fluid in a pipe or the like which comprises directing a beam of penetrative radiation across the pipe, preferably diametrically, the radiation being such, having regard to the contents of the pipe, that the energy dissipated from the beam within the pipe is a small fraction of the total energy and wherein of that dissipated energy a very large percentage is dissipated by scatter, and which also comprises selectively sampling from successive elemental lengths of the beam, the scatter as received by a detector outside the pipe and out of the direct influence of the beam.

Another feature of the invention is an apparatus for determining or indicating the density or change in density of a gaseous fluid within a pipe or the like by observing the scatter of a beam of penetrative radiation (e.g. gamma rays) directed into the pipe, in which the scatter ray detector is mounted outside the pipe and out of the direct influence of the said beam, means, which may be comprised within the detector, for translating the energy as received by the detector into the form of electric pulses having a characteristic (e.g. amplitude) which is directly proportional to the energy level of the scattered rays reaching the detector, analysing means in the output of the detector for selecting therefrom successively only pulses corresponding with predetermined energy levels and means for utilising the output of the analyser for operating a scaler or rate meter. In a modification the pulse height selector may be substituted by a collimator focussed on an elemental length of the beam and relatively movable so as to effect beam scanning.

The above and other features of the invention will be more readily understood by reference to the accompanying drawings in which FIGURE 1 diagrammatically illustrates one embodiment of the invention whilst FIGURE 2 illustrates diagrammatically a modification thereof.

In FIGURE 1 a source 1 of gamma radiation is contained within a collimator 2 and directs a beam 3 or rays diametrically towards a pipe 4, containing a gaseous fluid whose density is to be observed. The collimator 2 may be of usual construction, the source 1 being surrounded, except at the egress opening, by a body of lead to absorb radiation. It is not usually sufficient to obtain an average density of the fluid but what is usually required is to obtain an indication or analysis of the density at various regions across the pipe. A body 5 of lead absorbs the beam of rays emanating from the pipe. A detector, for example in the form of a scintillator 6 and photomultiplier 7 is mounted outside the tube and is adapted to receive rays scattered from the beam 3. The H.T. voltage on the tube 7 is controlled and metered in the control panel 8 in the usual manner. The output from the detector is taken to a pulse height analyser 9 whose output feeds a scaler or rate meter 10.

The principle of operation of the apparatus of FIGURE 1 requires knowledge of certain basic principles.

In the first place the contents of the pipe are assumed to be, and indeed must be, such that they disperse or absorb only a minute amount of the said beam 3 and it is also necessary that the amount of energy scattered by the fluid is very large compared with the amount absorbed by the fluid. If the contents of the pipe be steam with solid suspensions of say 20% by weight, a $Cs^{137}$ source (660 kev.) may be used.

With the energy of radiation required to penetrate the pipe walls adequately, the decrease in intensity of the beam as it traverses the pipe contents is almost entirely due to scattering of the radiation. Now this scattering is such that the energy of the scattered radiation is uniquely determined by the angle through which it is scattered and the energy of the primary radiation by the formula:

$$E_s = \frac{0.51}{1 - \cos\theta + \frac{0.51}{E_0}}$$

where $E_0$=energy of primary radiation $E_s$=energy of scattered radiation, $\theta$=angle through which radiation is scattered.

As an example, the energy of the scattered radiation at various angles from a source of energy 660 kev. (i.e. $C_s^{137}$) will be

| Angle: | Energy, kev. |
|---|---|
| 0° | 660 |
| 30° | 570 |
| 60° | 400 |
| 90° | 290 |
| 120° | 220 |
| 180° | 190 |

If the cross-sectional area of the primary beam as it passes through 0 is A, the only radiation that can reach the detector after being scattered through an angle of say, 90° is that from the small element of length $d$. If now, by means of a pulse height analyser, the detector only records gamma rays having an energy level close to that corresponding to a scattering angle of 90° (e.g. 290 kev. in the case of primary radiation of 660 kev.) then the radiation recorded by the detector can only come from the small volume $dA$ situated around the point 0.

By suitable adjustment of the energy level to which the detector is responsive to that corresponding to angles of scattering from 45°–135° the entire diameter may be "scanned" in small sections.

The amount of radiation scattered by a given volume is given by $$N_s = N_0 \mu P dv$$

where $N_s$ = intensity of scattered radiation
$N_0$ = intensity of primary radiation
$\mu$ = mass absorption coefficient of material under test
$P$ = density of material under test
$dv$ = elementary volume from which radiation is detected.

Thus this method has the advantage that the amount of scattered radiation, $N_s$, is directly proportional to the density $P$, of material within the volume $dv$, whereas in the direct absorption method the intensity only varies very slightly with alterations in density.

Several variations are clearly possible. For instance in FIGURE 2, where like reference characters indicate like parts with FIGURE 1, the detector is shielded by a collimator 12 and the assembly 12, 6, 7 is arranged to move in the direction of the arrows so as to scan the beam of radiation crossing the pipe from the source 1. Movement of assembly 12, 6, 7 is effected by a double rack unit 16 and gear wheel 15. Gear wheel 15, which is toothed over just less than half its circumference, is carried on rotary shaft 14. Continued rotation of rotary shaft 14 causes uniform linear motion of the assembly 12, 6, 7, first in one direction and then in the other so as to cause scanning of the beam from source 1. In this case the output from the tube 7 is fed to a pulse height discriminator 13 and to the scaler or rate meter 10.

In neither of the above systems is there any necessity for the detector to be mounted at 90° to the path of the primary beam.

The advantage of the pulse height analysis method over the collimator method, is that radiation scattered into the detector by the walls of the pipe etc. may be rejected as it can be shown that it must have a different energy to that from the desired scattered radiation.

A further advantage of the invention is that in the direct absorption method the intensity of the beam must be limited by the response time of the detector, whereas with scattered radiation the intensity of the primary beam may be increased manyfold, thereby increasing the speed of response of the arrangement.

The drawings are purely diagrammatic and modifications are possible without exceeding the invention. For instance the scanning means may be duplicated or multiplied to scan other diameters, or of course the indicator may be rotated about the pipe to subtend another or other diameters, e.g. one at right-angles to the position occupied in FIGURE 1.

I claim:
1. Apparatus for determining the density of a gaseous fluid at a given time which comprises a chamber through which the fluid is passed, means for directing a beam of penetrative radiation across the chamber, the radiation being such, having regard to the fluid characteristics, that energy dissipated from the beam within the chamber is a small fraction of the total energy and wherein of that dissipated energy a very large percentage is dissipated as scattered radiation, detector means outside the chamber and to one side of the beam for selectively sampling from successive elemental lengths of the beam the scattered radiation, a pulse height discriminator in the output of said detector means, for selecting pulses of successively varying amplitude determined by the angle through which the radiation energy is scattered and corresponding to said successive elemental lengths and a pulse counter in the output of the said discriminator.

2. Apparatus for determining the density of a gaseous fluid at a given time which comprises a chamber through which the fluid is passed, means for directing a beam of penetrative radiation across the chamber, the radiation being such, having regard to the fluid characteristics, that energy dissipated from the beam within the chamber is a small fraction of the total energy and wherein of that dissipated energy a very large percentage is dissipated as scattered radiation, means for selectively sampling from successive elemental lengths of the beam, the scattered radiation as received outside the chamber and out of direct influence of the beam including a detector situated outside the chamber and adapted to receive the scattered radiation from the beam throughout a predetermined length across the chamber, including means for rendering the detector responsive to an energy level corresponding to the angle of scattering at correspondingly successive elemental lengths of the beam and means for counting the pulses to which the detector is responsive per unit time.

3. Apparatus for determining the density of a gaseous fluid at a given time which comprises a chamber through which the fluid is passed, means for directing a beam of penetrative radiation across the chamber, the radiation being such, having regard to the fluid characteristics, that energy dissipated from the beam within the chamber is a small fraction of the total energy and wherein of that dissipated energy a very large percentage is dissipated as scattered radiation, means for selectively sampling from successive elemental lengths of the beam, the scattered radiation as received outside the chamber and out of direct influence of the beam including a detector situated outside the chamber and comprising a collimator focused on an elemental length of the beam so as to exclude scattered radiation from reaching the detector from areas other than the selected elemental length on which the collimator is focused, means for moving the detector and its collimator in a direction parallel with the beam, a frequency discriminator coupled to the detector and a pulse counter in the output of the said discriminator.

References Cited by the Examiner
UNITED STATES PATENTS

| | | |
|---|---|---|
| 2,304,910 | 12/42 | Hare. |
| 2,316,239 | 4/43 | Hare. |
| 2,938,119 | 5/60 | McKay. |
| 2,952,776 | 9/60 | Schumacher et al. |
| 2,997,586 | 8/61 | Scherbatskoy _____ 250—83.4 |

FOREIGN PATENTS 738,329  10/55  Great Britain.

RALPH G. NILSON, *Primary Examiner.*